(12) United States Patent
Jones et al.

(10) Patent No.: US 6,803,348 B2
(45) Date of Patent: Oct. 12, 2004

(54) HYDROPHOBICALLY MODIFIED POLYMERS FOR WATER CONTROL

(75) Inventors: Timothy G. J. Jones, Cottenham (GB); Gary J. Tustin, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/646,715

(22) PCT Filed: Mar. 22, 1999

(86) PCT No.: PCT/GB99/00737

§ 371 (c)(1),
(2), (4) Date: Nov. 16, 2000

(87) PCT Pub. No.: WO99/49183

PCT Pub. Date: Sep. 30, 1999

(65) Prior Publication Data

US 2003/0176586 A1 Sep. 18, 2003

(30) Foreign Application Priority Data

Mar. 20, 1998 (GB) .............................................. 9805880

(51) Int. Cl.$^7$ ................................................. C09K 3/00
(52) U.S. Cl. ........................ 507/221; 507/222; 507/223; 507/224; 507/225; 525/328.2; 525/328.4; 525/328.5
(58) Field of Search .......................... 525/328.5, 328.2, 525/328.4; 57/221, 222, 223, 224, 225

(56) References Cited

U.S. PATENT DOCUMENTS

| | | | |
|---|---|---|---|
| 3,719,228 A | | 3/1973 | Carcia |
| 4,532,052 A | | 7/1985 | Weaver et al. |
| 4,617,132 A | | 10/1986 | Dalrymple et al. |
| 5,003,006 A | | 3/1991 | Chu et al. |
| 5,203,834 A | | 4/1993 | Hutchins et al. |
| 5,280,078 A | * | 1/1994 | Gregor et al. ............ 525/328.5 |
| 5,475,047 A | * | 12/1995 | Abraham et al. ........ 525/328.2 |

OTHER PUBLICATIONS

Bock et al, Solution properties of hydrophobically associating water–soluble polymers, Macromolecular complexes in chemistry and biology, Dubin et al, (eds), Springer–Verlag, Berlin, 1994, pp. 33–50.

Bock et al, Structure and properties of hydrophobically associating polymers Adv. Chem. Series 223, American Chemical Society, Glass (ed.), Washington D.C., 1989, pp. 411–424.

Chu et al, Photophysical studies of hydrophobically modified polyelectrolytes, Adv. Chem. Series 223, American Chemical Society, Glass (ed.), Washington D.C., 1989, pp. 325–341.

Lindman et al, Polymer–surfactant interactions—recent developments Interactions of Surfactants with Polymers and Proteins, Goddard and Ananthapadmanabhan (eds.), CRC Press, Boca Raton, Florida, 1992, pp. 203–276.

McCormick et al, Synthetically structured water–soluble copolymers. Associations by hydrophobic or ionic mechanisms, Adv. Chem. Series 223, American Chemical Society, Glass (ed.), Washington D.C., 1989, pp. 437–454.

Magny et al, Aggregation of hydrophobically modified polyelectrolytes in dilute solution: ionic strength effects, Macromolecular complexes in chemistry and biology, Dublin et al., (eds), Springer–Verlag, Berlin, 1994, pp. 51–62.

Middleton et al., Rheological properties of hydrophobically modified acrylamide–based polyelectrolytes, Water–soluble polymers: synthesis, solution properties and applications, ACS Symp. Series 467, American Chemical Soc, Shalaby et al (eds), Washington D.C., 1991, pp. 338–348.

Molyneux, Role of labile cross–links in the behavior of water–soluble polymers, Water–soluble polymers: synthesis, solution properties and applications, ACS Symp. Series 467, American Chemical Soc, Shalaby et al (eds), Washington D.C., 1991, pp. 232–248.

Narh et al, The effect of counterions on the chain conformation of polyelectrolytes, as assessed by extensibility in elongational flow: the influence of multiple valency, J. Polym. Sci.: Part B: Polymer Phys., vol. 32, 1994, pp. 1697–1706.

Sarrazin–Cartalas et al, Association and thermal gelation in mixtures of hydrophobically modified polyelectrolytes and nonionic surfactants Langmuir, vol. 10, 1994, pp. 1421–1426.

Seright, Gel placement in fractured systems, SPE Improved Oil Recovery Symposium, Tulsa, Oklahoma, Apr. 17–20, 1994, SPE 27740.

Strauss, Hydrophobic polyelectrolytes, Adv. Chem. Series 223, American Chemical Society, Glass (ed.), Washington D.C., 1989, pp. 317–324.

Sydansk, Acrylamide–polymer/chromium(III)–carboxylate gels for near wellbore matrix treatments, Seventh Symposium on Enhanced Oil Recovery, Tulsa, Oklahoma, Apr. 22–25, 1990, SPE/DOE 20214.

Wang et al, Synthesis and catalytic properties of hydrophobically modified poly(alkylmethyldiallylammonium chlorides), Eur. Polym. J., vol. 31, No. 5, 1995, pp. 409–417.

Wang et al, Aqueous–solution behavior of hydrophobically modified poly(acrylic acid), ACS Symp. Series 467, American Chemical Soc, Washington D.C., 1991, pp. 218–231.

* cited by examiner

*Primary Examiner*—Bernard Lipman
(74) *Attorney, Agent, or Firm*—Stephen Schlather; Robin Nava

(57) ABSTRACT

The use of a hydrophobically modified water soluble polymer is described capable of being chemically cross-linked so as to produce a stable gel for blocking a water-bearing formation from a hydrocarbon-producing well. The polymer is essentially linear having hydrophilic side groups located at random positions along its backbone.

3 Claims, No Drawings

HYDROPHOBICALLY MODIFIED POLYMERS FOR WATER CONTROL

The present invention relates to cross-linkable hydrophobically modified water-soluble polymers for reducing the water production of a hydrocarbon well drilled through subterranean formations. More particularly it relates to such polymers and polymer containing compositions for selectively reducing the flow of subterranean aqueous fluids into a well while maintaining the hydrocarbon production.

BACKGROUND OF THE INVENTION

During the life cycle of a hydrocarbon well, e.g., a well for extracting oil or natural gas from the Earth, the producing well commonly also yields water. In these instances, the amount of water produced from the well tends to increase over time with a concomitant reduction of hydrocarbon production. Frequently, the production of water becomes so profuse that remedial measures have to be taken to decrease the water/hydrocarbon production ratio. As a final consequence of the increasing water production, the well has to be abandoned.

Various techniques have been developed and used for reducing the quantity of water produced from oil and/or gas wells. For example, U.S. Pat. No. 3,719,228 discloses a method of treating a subterranean formation containing hydrocarbons and brine to stimulate the production of hydrocarbons: A preflush composition comprised of a water solution of rosin soap and fatty acid soap is injected into the formation. The preflush reacts with connate brine to produce a precipitate that blocks the brine-bearing passages. The composition does not react with hydrocarbons thereby allowing hydrocarbon-bearing passages to remain open. Another alternative method is disclosed in U.S. Pat. No. 4,617,132: A sandstone formation is contacted with an aqueous solution containing a water soluble anionic polymer having a molecular weight greater than 100,000. As the next step, the anionic polymer is contacted with a fluid containing a water soluble cationic polymer having a weight greater than 1,000. As a result of the contact of the anionic with the cationic polymer, coacervation occurs between the two polymers which reduces the amount of the anionic polymer removed from the formation by fluids produced therefrom. The presence of stabilized polymer in the formation reduces the water/oil ratio by reducing the permeability of the formation to water in the wellbore area.

In yet another technique, disclosed in U.S. Pat. No. 5,203,834, comprises the steps of injecting a gas, a polymer composition capable to form a foamed gel with the gas, and a delayed gel degrading agent being capable of opening pathways in the gel.

The gelation of high molecular weight polymers ($M_w > 10^6$ g/mol) has been extensively used in the development of water-based treatment fluids for water control is further described for example by R. D. Sydansk in "Acrylamide-polymer/chromium(III)-carboxylate gels for near wellbore matrix treatments", 7th SPE Symp. Enhanced Oil Recovery, Tulsa, Okla., April 1988, SPE/DoE 20214, or by R. S. Seright in: "Placement of gels to modify injection profiles", SPE/DoE Symp. Enhanced Oil Recovery, Tulsa, Okla., April 1994, SPE 27740. Typically for those methods, an aqueous solution of a high molecular weight polymer, such as a polyacrylamide/polyacrylate copolymer (a so-called partially-hydrolysed polyacrylamide), is gelled in situ in a porous formation using a metal cross-linker such as $Cr^{3+}$ or small water-soluble organic cross-linkers such as formaldehyde and formaldehyde/phenol. Other water-soluble polymers such as poly(vinyl alcohol), the polysaccharide guar gum and the copolymer poly(vinylpyrrolidone-co-2-acrylamido-2-methyl-1-propanesulphonic acid) which can be cross-linked with a variety of cross-linking agents such as $Zr^{4+}$ and boric acid.

A more recent approach is described by A. Keller and K. A. Narh in: "The effect of counterions on the chain conformation of polyelectrolytes, as assessed by extensibility in elongational flow: the influence of multiple valency", J. Polym. Sci. : Part B: Polymer Phys., 32, 1697–1706 (1994). It includes the cross-linking of poly(sodium 4-styrenesulphonate) using $Al^{3+}$ ions to form a gel. The concentration of the high molecular weight hydrophilic polymers used to form hydrogels is typically in the range 3–10 g/l.

Hydrophobically-modified polymers as such and their application as thickening agents in aqueous fluids has been extensively described. The principal application of these polymers is as viscosifying agents and they are commonly referred to as associative thickeners; these polymers are also known as polysoaps. The associative behaviour is generated by a small mole fraction (typically $\leq 0.05$) of hydrophobic groups which, as separate monomers, are not soluble in water. The hydrophobic groups undergo intermolecular association in aqueous solution above the overlap concentration which results in a significant increase in solution viscosity.

Hydrophobically-modified polymers can be gelled in the presence of monomeric surfactants. For example, large increases in the viscosity of solutions of hydrophobically-modified poly(acrylic acid) in the presence of anionic, cationic and non-ionic surfactants have been disclosed. A brief review of the interaction between hydrophobically-modified polymers and surfactants can be found in: Lindman, B. and Thalberg, K., "Polymer-surfactant interactions—recent developments" in Interactions of Surfactants with Polymers and Proteins, E. D. Goddard and K. P. Ananthapadmanabhan (eds.), pp. 203–276, CRC Press, Boca Raton, Fla. (1992).

In the U.S. Pat. No. 4,532,052, the use of branched organic polymers for various well treating operations is described. The known polymers include hydrophilic and combinations of hydrophilic and hydrophobic side groups. The preferred examples are characterized as having large hydrophilic branches.

In the U.S. Pat. No. 5,003,006, there are described cross-linked block copolymers containing polar and non-polar segments, with the polar segments generally making up at least 50 per cent.

It is the object of the invention to provide new polymers for water control application.

SUMMARY OF THE INVENTION

According to a first aspect of the invention, hydrophobically modified water-soluble polymers are provided which are capable of being chemically cross-linked to produce permanent gels in water-bearing formations. The polymers are characterized by a linear chain or backbone and attached thereto hydrophobic side groups at random locations. The term "linear" is defined as the absence of extended side groups/chains others than the hydrophobic groups. The term "extended" can be interpreted as having a molecular weight of more than 200.

It has been found that hydrophobically modified polymers when based on block copolymers, tend to form an inferior gel presumably due to presence of inhomogeneous gelation. In addition there is economic advantage when producing polymers with high molecular weight through a random co-polymerization process. The use of large polymers is advantageous as it reduces the polymer concentration required to achieve a desired level of viscosity. Within the scope of the present invention, a high molecular weight can be defined as a molecular weight in excess of 50,000, more preferably in excess of 100,000. A preferable upper limit for the size of the polymers is given by a molecular weight of 15 million, preferably 5 million, more preferably 500,000 or less.

The polymers preferably comprise low concentrations (0.5–5 mole percent) of hydrophobic monomers which randomly co-polymerise with the hydrophilic monomers to form random copolymers. The hydrophilic units of the polymer, which constitute preferably 95 –99.5 mole percent of the polymer chain, contain preferably at least some small fraction of functional groups which can be chemically cross-linked to produce a gel. Alternatively, the hydrophobic groups themselves can contain chemical functions which can be the sites of cross-linking. Preferred hydrophobic groups are alkyl groups of more than six, preferably eight, and even more preferably 12 carbon atoms, and derivatives thereof.

Chemical cross-linking is defined as forming a chemical bond between the cross-linked polymers. Chemical cross-linking is understood to be stable and thermally irreversible. Some of the advantages in the use of hydrophobically modified polymers are responsiveness to hydrocarbons resulting in a reduction in the adhesive strength of gels and an extreme retardation of gelation, and solubilisation of large organic cross-linking agents.

The cross-linking agents can be either inorganic ions (or ionic complexes) or polar organic molecules. When the polymer contains ionic groups such as carboxylate or sulphonate functions the polymer chains can be cross-linked by inorganic ions such as chromium(III) or zirconium(IV), frequently in the presence of ligands, such as acetate or adipate ions, to control the rate of cross-linking. Alternatively, organic cross-linking agents can be used. For example, the amide groups on poly(acrylamide) can be cross-linked with formaldehyde or a mixture of formaldehyde and phenol. The disadvantages of using formaldehyde or similar small molecules are their toxicity and issues of disposal. The larger reagents such as hexanal and heptanal, which are not classed as toxic, would be suitable cross-linking agents but are not sufficiently soluble in water to cross-link normal hydrophilic polymers such as the poly(acrylamide)/poly(acrylate) copolymer. However, these larger cross-linking agents are solubilised in aqueous solutions by hydrophobically-modified poly(acrylamide) polymers and can thence cross-link them.

These and other features of the invention, preferred embodiments and variants thereof, and further advantages of the invention will become appreciated and understood by those skilled in the art from the detailed description following below.

MODE(S) FOR CARRYING OUT THE INVENTION

A large number of hydrophobically-modified polymers are known as such and suitable for the purpose of the present invention. These polymers are based on the modification of common water-soluble (hydrophilic) polymers such as poly(acrylamide), poly(acrylic acid), poly(vinylpyridine), hydroxyethylcellulose and poly(ethylene oxide). The structure of examples of hydrophobically-modified polymers are given below for poly(sodium 4-styrenesulphonate (a), poly (vinylpyridine) (b), and poly(acrylamide) (c):

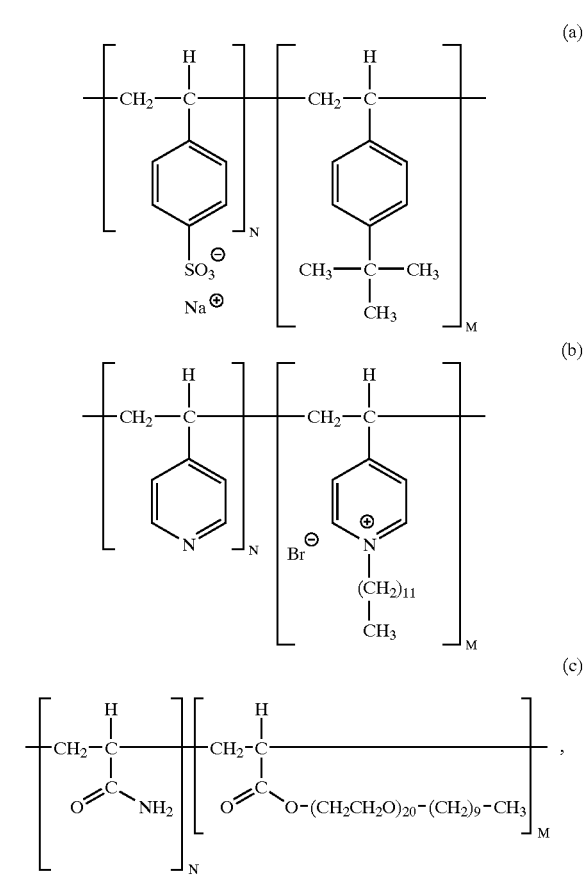

The fraction M/(M+N) denotes the mole fraction of hydrophobic monomers in the polymer.

The following formulae describe the structure of further examples which can be readily cross-linked using known cross-linkers.

The structure of a hydrophobically-modified poly(acrylamide) where the hydrophobic modification takes the form of replacing about 3 mole percent (M/(M+N)=0.03) of the acrylamide units with the hydrophobic monomer n-nonyl acrylate is:

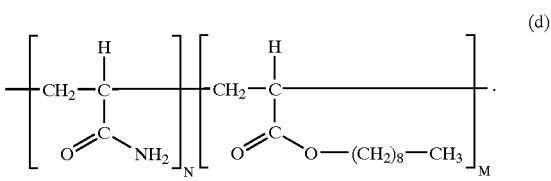

This polymer has an average molecular weight of about $5 \times 10^6$ g/mole and it can be readily cross-linked with chromium(III) or zirconium(IV) or the organic cross-linker hexanal. Where the gels formed by conventional poly(acrylamide)/ poly(acrylate) copolymers undergo syneresis and shrink, the gels formed by hydrophobically-modified polymers in otherwise identical formulations undergo syneresis at approximately half the rate of the hydrophilic polymers. It is also observed that the cross-linking of the hydrophobically-modified poly(acrylamide) is less sensitive to the concentration of divalent ions (Ca$^{2+}$, Mg$^{2+}$).

The structure of another hydrophobically-modified poly (acrylamide) where the hydrophobic modification takes the form of replacing about 1 mole percent (M/(M+N)=0.01) of the acrylamide units with the hydrophobic monomer N-decylacrylamide is:

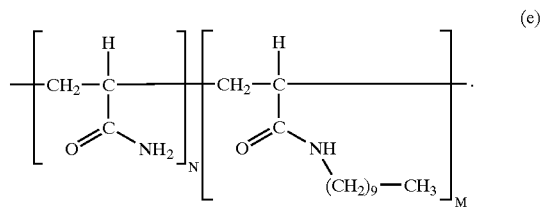

This polymer can also be cross-linked using metal ions (Cr(III), Zr(IV)) and organic molecules (hexanal).

An additional feature of hydrophobically-modified polymers such as (d) and (e) is that they can be prevented from cross-linking in contact with hydrocarbon. The prevention of cross-linking can arise from two possible mechanisms. Firstly, the larger organic cross-linker can be removed from the polymer solution by solubilisation in the contacting hydrocarbon. The cross-linker hexanal, which is solubilized by the hydrophobically-modified polyacrylamide, is readily soluble in hydrocarbon and can be extracted from the polymer solution. Secondly, the solution of hydrophobically-modified polymer can partly solubilize the hydrocarbon which itself can be sufficient to prevent cross-linking. Thus a solution of hydrophobically-modified poly (acrylamide) with the metal ion cross-linker such as Cr(III) or a small water-soluble cross-linker such as formaldehyde can be prevented from cross-linking when mixed with hydrocarbon.

What is claimed is:

1. A method for reducing subterranean aqueous fluid flow into a well drilled through a hydrocarbon-bearing formation, comprising the steps of:

(a) providing a composition comprising water soluble hydrophobicaiiy-modified polymers having a linear hydrophilic backbone with hydrophobic side groups along said backbone and functional groups for cross-linking said polymers;

(b) allowing said composition to contact said formation; and (c) cross-linking said hydrophobically-modifled polymers of the composition to form a cross-linked gel selectively reducing said subterranean aqueous fluid flow.

2. The method of claim 1, wherein the hydrophobically-modified polymers comprise poly(acrylamide).

3. The method of claim 1, wherein the functional groups for crosslinking comprise chromium (III).

* * * * *